UNITED STATES PATENT OFFICE.

ALBRECHT HEIL, OF FRANKFORT-ON-THE-MAIN, GERMANY, ASSIGNOR TO CONRAD HUBERT AND SAMUEL STERN, BOTH OF NEW YORK, N. Y.

GALVANIC CELL.

1,064,211. Specification of Letters Patent. Patented June 10, 1913.

No Drawing. Application filed May 2, 1912. Serial No. 694,733.

*To all whom it may concern:*

Be it known that I, ALBRECHT HEIL, a subject of the Emperor of Germany, residing at Frankfort-on-the-Main, Germany, have invented certain new and useful Improvements in Galvanic Cells, of which the following is a specification.

My invention relates to galvanic cells and particularly to the depolarizing electrodes of such cells and to the process of producing such electrodes.

I have discovered that an improved depolarizing electrode may be produced by impregnating a porous carbon electrode with manganese dioxid, and this invention has for an object to provide such depolarizing electrodes and to provide a simple and reliable process for so impregnating the porous carbon electrodes.

Other objects and advantages of my invention will appear from the following description.

I shall now describe a carbon electrode embodying my invention and one method of carrying out my process and shall thereafter point out my invention in claims.

In accordance with my invention, a manganese salt, preferably manganese carbonate, is dissolved in nitric acid, and the crystals of manganese nitrate which are thus formed are dissolved in alcohol. A suitable porous carbon electrode is then immersed in this solution until the solution is uniformly distributed through the pores of the carbon, and the carbon is completely impregnated therewith. The carbon electrode is then dried and is then heated to a sufficient temperature to drive off the solvent of the crystals and to decompose the nitrate and drive off the acid, and I have found in practice that a temperature of from 128 to 132 degrees centigrade is required for this purpose. After the carbon is so heated, there remains in the pores and upon the surface of the carbon an adherent, exceptionally active and very durable coating of manganese dioxid.

I have found that the carbon electrodes are particularly effective if used with a positive electrode of lead in a potassium chlorid solution or with a positive electrode of zinc in a zinc chlorid solution. Negative electrodes embodying my invention remain active for a very long time and are very superior to the depolarizing electrodes in common use.

It is obvious that various modifications may be made in the herein-described depolarizing electrode and in the process for producing the same within the principle and scope of my invention.

I claim:

1. The process of producing depolarizing electrodes consisting of saturating a body of porous carbon with a solution of manganese nitrate and then drying the carbon and then heating the carbon to such a temperature that the nitrate is decomposed.

2. The process of producing depolarizing electrodes consisting of immersing a body of porous carbon in a solution of manganese nitrate dissolved in alcohol and then drying the carbon and then heating it to a temperature sufficient to drive off the alcohol and the acid.

3. The process of producing depolarizing electrodes consisting of dissolving a manganese salt in nitric acid and then dissolving the crystals of manganese nitrate so formed in alcohol and then immersing a suitable porous carbon in this solution until the carbon is impregnated, and then drying the carbon and then heating it to a temperature sufficient to drive off the alcohol and the acid.

4. The process of producing depolarizing electrodes consisting of dissolving a manganese carbonate in nitric acid and then dissolving the crystals of manganese nitrate so formed in alcohol and then immersing a suitable porous carbon in this solution until the carbon is impregnated, and then drying the carbon and then heating it to a temperature sufficient to drive off the alcohol and the acid.

In testimony whereof I have affixed my signature in presence of two witnesses.

ALBRECHT HEIL.

Witnesses:
 JEAN GRUND,
 CARL GRUND.